(12) United States Patent
Bazer-Bachi et al.

(10) Patent No.: US 10,323,194 B2
(45) Date of Patent: Jun. 18, 2019

(54) RADIAL BED REACTOR ALLOWING THE USE OF A SMALL QUANTITY OF CATALYST

(71) Applicant: IFP Energies Nouvelles, Rueil-Malmaison (FR)

(72) Inventors: Frederic Bazer-Bachi, Irigny (FR); Fabrice Deleau, Pierre-Benite (FR); Eric Lemaire, Anse (FR); Alexandre Pagot, Saint Genis Laval (FR); Gerard Papon, Les Essarts le Roi (FR); Pierre-Yves Le Goff, Paris (FR); Eric Sanchez, Saint Genis Laval (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 15/533,660

(22) PCT Filed: Nov. 4, 2015

(86) PCT No.: PCT/EP2015/075738
§ 371 (c)(1),
(2) Date: Jun. 7, 2017

(87) PCT Pub. No.: WO2016/091489
PCT Pub. Date: Jun. 16, 2016

(65) Prior Publication Data
US 2017/0313950 A1    Nov. 2, 2017

(30) Foreign Application Priority Data

Dec. 8, 2014 (FR) ..................... 14 62077

(51) Int. Cl.
*C10G 35/12* (2006.01)
*C10G 35/09* (2006.01)
(Continued)

(52) U.S. Cl.
CPC ............... *C10G 35/12* (2013.01); *B01J 8/12* (2013.01); *B01J 23/626* (2013.01); *C10G 35/09* (2013.01);
(Continued)

(58) Field of Classification Search
CPC .......... B01J 8/12; B01J 23/626; C10G 35/39; C10G 35/12; C10G 2400/30
See application file for complete search history.

(56) References Cited

U.S. PATENT DOCUMENTS

| 4,411,870 A | 10/1983 | Kroushl et al. |
| 8,715,584 B2 | 5/2014 | Sanchez et al. |

(Continued)

FOREIGN PATENT DOCUMENTS

| FR | 2922124 A1 | 4/2009 |
| FR | 2948580 A1 | 2/2011 |

OTHER PUBLICATIONS

International Search Report dated Feb. 1, 2016 issued in corresponding PCT/EP2015/075738 application (2 pages).

*Primary Examiner* — Brian A McCaig
(74) *Attorney, Agent, or Firm* — Millen, White, Zelano and Branigan, P.C.

(57) ABSTRACT

The present invention describes a type of radial bed reactor which can allow a small quantity of catalyst to be used. Application to a regenerative reforming process reactor.

6 Claims, 2 Drawing Sheets

(51) Int. Cl.
 *B01J 8/12* (2006.01)
 *B01J 23/62* (2006.01)
(52) U.S. Cl.
 CPC ............... *B01J 2208/00884* (2013.01); *B01J 2208/00938* (2013.01); *C10G 2400/30* (2013.01)

(56) References Cited

U.S. PATENT DOCUMENTS

| | | |
|---|---|---|
| 9,050,569 B2 | 6/2015 | Douziech et al. |
| 9,339,780 B2 | 5/2016 | Sanchez et al. |
| 2011/0049013 A1 | 3/2011 | Sanchez et al. |
| 2011/0070149 A1 | 3/2011 | Douziech et al. |
| 2011/0206573 A1* | 8/2011 | Ackley ............. B01D 53/0431 422/218 |
| 2014/0094634 A1 | 4/2014 | Sanchez et al. |

* cited by examiner

RADIAL BED REACTOR ALLOWING THE USE OF A SMALL QUANTITY OF CATALYST

FIELD OF THE INVENTION

The invention relates to the technology of radial bed reactors with movement of a catalyst under gravity and a transverse flow of feed. More particularly, it is applicable to catalytic reforming of gasolines with the continuous regeneration of catalyst. The invention allows the use very small quantities of catalyst employing radial bed technology, a feature which is not possible with current technologies.

The present reactor can be used to obtain HSVs of more than 50 $h^{-1}$ (ratio of the flow rate of feed to the mass of catalyst).

EXAMINATION OF THE PRIOR ART

In the prior art concerning radial bed reactors, U.S. Pat. No. 6,221,320 may be cited which carries out an overview of conventional technologies (FIGS. 10 and 11).

In the prior art, the catalytic bed in a radial bed reactor is delimited by two screens, an inner screen and an outer screen. More precisely, these are one of the following types:
  an inner screen which defines the central collector for the gaseous effluents;
  an outer screen which defines the volume of gaseous feed supplied.

The process fluid (or feed) arrives via the outer volume delimited between the outer shell and the outer screen. It then passes through the catalytic bed in a manner which is substantially horizontal and orthogonal to the movement of the catalyst which moves under gravity, i.e. substantially vertically from top to bottom.

The process fluid, which is flowing radially, and the catalyst, which is moving under gravity, are separated by the inner screen which is generally cylindrical in shape with the same substantially vertical axis as the outer screen.

The cylinder delimited by the inner screen acts as a central collector for evacuating the gaseous effluents from the reaction zone included between the outer screen and the inner screen, and thus is substantially annular in shape.

Radial bed technology suffers from many constraints. In particular, the speeds of the gases passing through the catalytic bed are limited in order to:
  avoid cavitation at the entrance to the bed;
  avoid jamming the catalyst against the inner screen as it exits—this is known as pinning;
  reduce the pressure drops (a function of the speed and the thickness of the bed).

In order to respond to questions of homogeneous distribution over the entire height of the catalytic bed, a perforated screen intended to generate the pressure drop may be added to the central collector.

For construction reasons, it is necessary to leave a sufficient space between the inner screen and the outer screen. The cumulative effect of all of these constraints is that the minimum volume of catalyst which can be enclosed in a shell is highly limited. In general in the prior art, the maximum HSVs are of the order of 20 $h^{-1}$, while the reactor of the present invention can be used to obtain HSVs of more than 50 $h^{-1}$.

Document U.S. Pat. No. 4,411,870 describes a reactor containing a plurality of reaction chambers, each of these chambers comprising an annular zone for the catalyst and the feed being distributed in the various reaction zones in a manner such as to produce a uniform flow of reagents in the various zones. That document does not provide any information as to the geometrical characteristics of said reaction zones.

BRIEF DESCRIPTION OF THE INVENTION

Figure 1A:
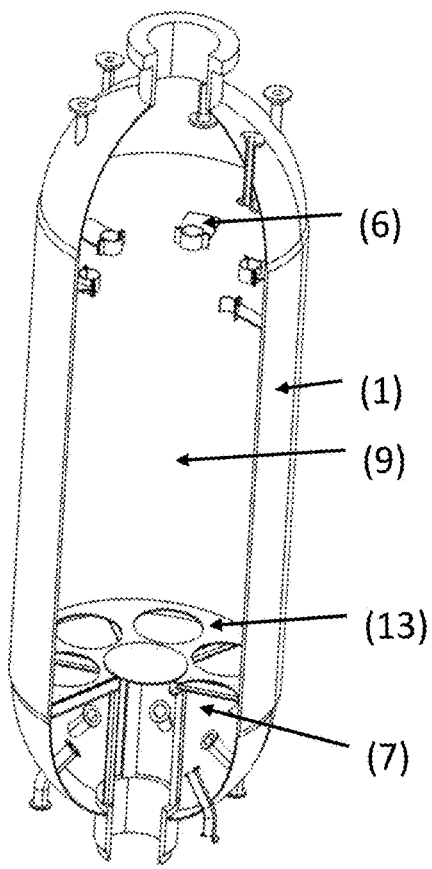
FIG. 1a represents an exploded view of the shell (1) of the reactor of the invention, but not containing a module (M), in order to be able to see the floor (13) which supports said modules.

The present invention describes a radial bed type reactor intended to use a small quantity of catalyst of the order of one tonne and which may advantageously constitute the first reactor in the series in a unit for the catalytic reforming of gasolines which in the prior art comprises three or four reactors placed in series.

This reactor can be termed modular in the sense that it is constituted by an assembly of identical modules functioning in parallel and enclosed in a single shell.

More precisely, the reactor of the present invention is a reactor with a radial flow of feed and a gravitational flow of catalyst constituted by an assembly of substantially identical modules (M) enclosed in a single shell (1), having means (10) for introducing catalyst located in the upper portion, and means (11) for evacuation of said catalyst located in the lower portion (7), and a means for introducing feed via upper central pipework (8) and means for evacuation of effluents via lower central pipework (12), each module being in the shape of a cylinder delimited by a substantially vertical outer wall (2) and a substantially vertical inner wall (5), the two walls being assembled so as to define an annular zone (4) containing the catalyst, and the outer (2) and inner (5) walls of each module being permeable to the gaseous feed and to gaseous effluents, and generally being constituted by a Johnson or equivalent type screen, said modules being positioned vertically in a generally symmetrical manner with respect to the centre of the shell (1), and the effluents from each module leaving via the central collector (3) of each module which communicates with the lower portion (7) of the shell (1), the inner volume (9) and the lower volume (7) being separated by a floor (13) which forms a seal between the two volumes and also serves to support the modules (M), and the thickness of the radial bed of each module (M) being in the range 10 to 400 mm, and preferably in the range 50 to 250 mm.

Of the possible dispositions of the modules within the shell (1), alignments of said modules in a plurality of concentric circles may be cited. In general, irrespective of the particular disposition of the modules in the shell, they are distributed in a manner which is practically symmetrical with respect to the centre of the shell (1).

Preferably, in the radial flow reactor of the present invention, the modules (M) are distributed regularly in a circle inside the shell.

Preferably, the number of modules in the reactor in accordance with the present invention is in the range 3 to 12, and highly preferably in the range 5 to 10.

Preferably, the ratio of height to diameter in the reactor in accordance with the present invention is in the range 3 to 30, highly preferably in the range 7 to 11 for each module (M).

Advantageously, this reactor may be used as a head reactor in a process for the catalytic reforming of a gasoline type cut using a series of three or four radial bed reactors. In this case, the flow of feed and catalyst may be described as follows:
- the feed enters the shell (1) via the inlet pipework (8) located in the upper portion of the reactor and then occupies the inner volume (9) from which it penetrates into the interior of each module (M), passing through the outer screen of said module (2);
- the feed passes through the catalytic bed contained in the annular zone (4) of each module (M) and the effluents resulting from the catalytic reaction are collected in the central collector (3) of each module;
- the effluents from each module are collected in the lower volume (7) of the shell (1), and are evacuated from the reactor via the outlet pipework (12);
- the catalyst is admitted into each module via admission pipework (10) and flows under gravity into the annular zone (4) of each module, then is evacuated from the module via outlet pipework (11).

In a process for the catalytic reforming of a gasoline type cut using the reactor in accordance with the present invention, the HSV (ratio of the flow rate of feed to the weight of catalyst) is more than $50\ h^{-1}$, preferably more than $100\ h^{-1}$.

In a process for the catalytic reforming of a gasoline type cut using the reactor in accordance with the present invention, the feed may have a paraffins content which may be up to 70% by weight, and may even be an entirely paraffinic feed.

DETAILED DESCRIPTION OF THE INVENTION

The invention consists essentially of producing an assembly of "modules" of small sized radial beds which can be used to obtain much higher HSVs than in traditional reactors, the assembly of these modules being enclosed in a single shell.

Figure 1B:
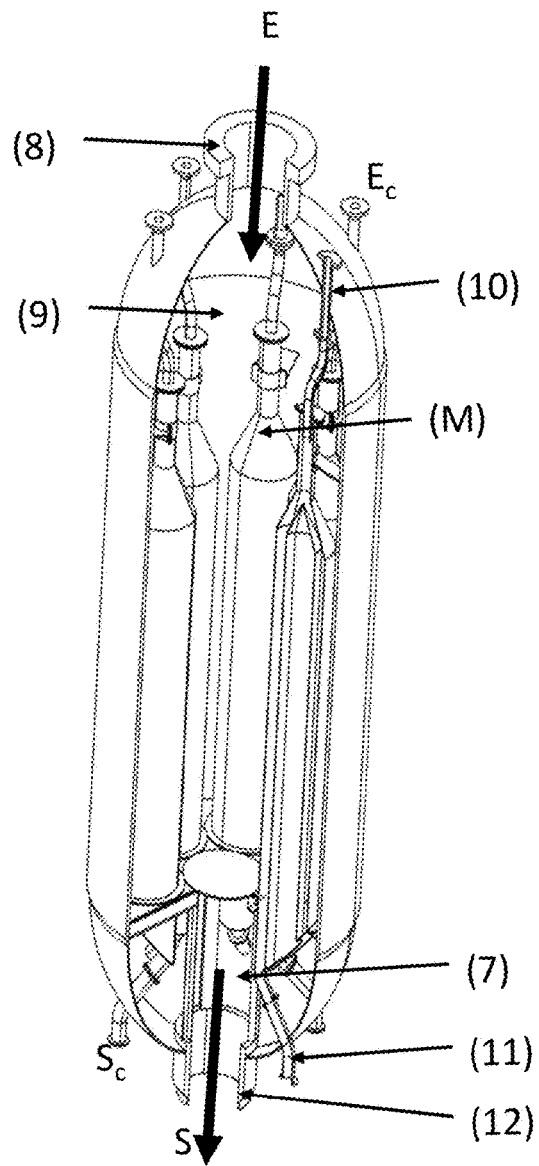
FIG. 1b is an exploded view of the reactor of the invention in which it is possible to see the modules (M) and their connection with the upper portion of the shell (1), as well as the inlet legs (10) for the catalyst and the withdrawal legs (11).

The description below is based on FIG. 1a which represents an exploded view of the reactor and without a module, so that the outer shell (1) can be seen properly, and is also based on FIG. 1b which represents the reactor in an exploded view containing the modules.

Figures 2A, 2B, 2C:
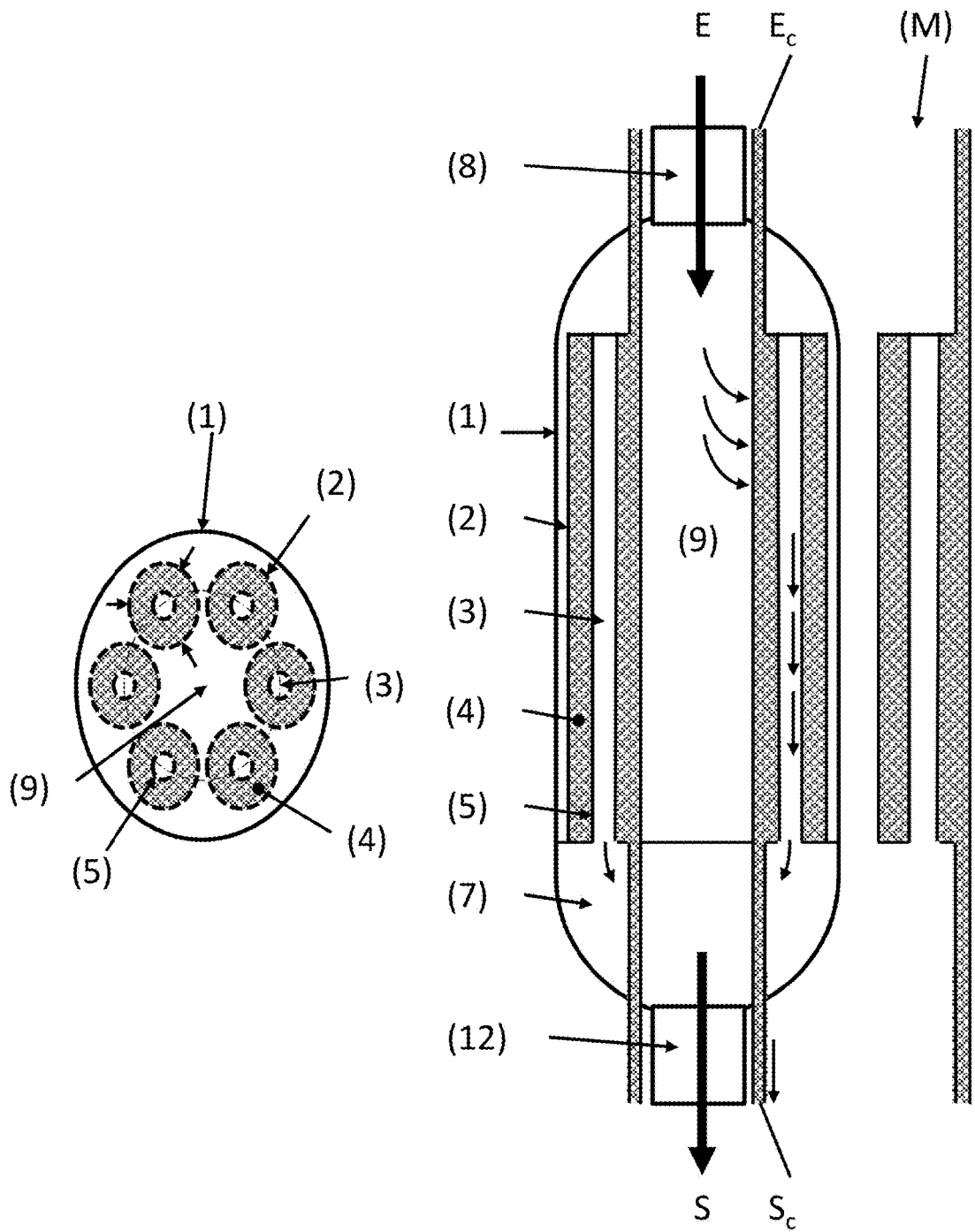
FIG. 2a represents a section of the reactor viewed from the top; it is possible to see the modules (M), the catalytic zone of each module (4) and the outer (2) and inner (3) screens defining said catalytic zone.
FIG. 2b represents a section of the reactor viewed from the side, in order to visualize the feed inlet (8) and the effluent outlet (12) as well as the volume (9) for distribution of the feed over all of the modules (M) and the lower collection volume for effluents obtained from each module (M).
FIG. 2c represents a module (M) viewed from the side; it is thus possible to understand clearly the corresponding entity in situ in the reactor.

FIGS. 2a and 2b represent a top view of a reactor (FIG. 2a) and a side view (FIG. 2b).

The feed enters the shell (1) by means of the pipework (8) located in the upper portion. The feed then occupies the inner volume (9), from which it penetrates into the interior of each module, passing through the outer screen of said module (2).

The feed passes through the catalytic bed contained in the annular zone (4) of each module and the effluents resulting from the catalytic reaction are collected in the central collector (3) of each module. The effluents from each module are collected in the lower volume (7) of the shell (1).

The inner volume (9) and the lower volume (7) are separated by a floor (13) which makes a seal between the two volumes and which can also be used to support the modules (M).

The catalyst is admitted into each module via admission pipework (10). It flows under gravity into the annular zone (4) of each module and then is evacuated from the module via outlet pipework (11). There is at least one set of admission pipework (10) and one set of outlet pipework (11) per module.

The modules are in the shape of cylinders delimited by an outer wall (2) which is substantially vertical and a substantially vertical inner wall (5), the two walls being assembled so as to define an annular zone (4) containing the catalyst. The outer (2) and inner (5) walls of each module are permeable to the feed and to the gaseous effluents and are generally constituted by a Johnson screen or other equivalent means. These modules are positioned in one and the same shell (1) which acts as a volume for supplying gas to the process via the upper portion (6) and for evacuation of the effluents.

The effluents from each catalytic zone are then collected in a common volume (7) located in the lower portion of the shell (1). The modules can be used to produce very thin beds of catalysts, which considerably reduces the pressure drop constraints.

The ratio of height to diameter of each module is generally in the range 3 to 30, preferably in the range 7 to 11.

The thickness of the radial bed of each module is in the range 10 to 300 mm, generally less than 100 mm (1 mm=$10^{-3}$ m).

The HSV (ratio of the flow rate of feed to the weight of catalyst) is generally more than $50\ h^{-1}$, preferably more than $100\ h^{-1}$.

The centres of each module are advantageously positioned along a circle, as can be seen by way of example in FIG. 2a for a reactor containing 6 identical modules.

The number of modules is generally in the range 3 to 12, preferably in the range 5 to 10.

The central collectors (3) of each module communicate with the same volume (7) located in the lower portion of the shell (1) which can be used to evacuate the effluent via the outlet pipework (12).

Anchors (6) are located in the upper portion of the shell (1) to support the modules (M) placed on the plate (13). This plate (13) is impervious in order to prevent any mixing of the feed contained in the upper volume (9) with the effluents collected in the lower volume (7).

Said plate (13) is held up by reinforcing posts and beams in order to support the weight of the modules (filled with catalyst).

Each module (M) is provided with a plate for fixing to the plate (13), this fixing possibly being obtained using any means known to the skilled person.

The reactor also provides for visual inspection of the reactor through a manhole once it has been assembled, in particular for inspection of at least part of the outer screens and inner screens. Placing a plurality of modules in parallel also means that one can be put out of commission if it fails while the system can continue to operate using the remaining modules.

Thus, the proposed system can be used to target high HSVs in order to optimize the reaction performances of the process, while at the same time proposing a mechanical design which is realistic, modular, flexible and easy to maintain.

Examples

The following examples serve to illustrate the dimensions of a reactor in accordance with the invention for placing at the head of a regenerative reforming unit processing a feed with a naphtha flow rate of 150 t/h of feed.
- Example 1 represents the reference case, not in accordance with the invention;
- Example 2 represents the performances of a unit in accordance with the invention provided with a head reactor operating under the same conditions and with the same total quantity of catalyst as in Example 1;
- Example 3 illustrates the performances of a unit having the same characteristics as those of Example 2, but processing a more severe feed.

In Example 1, a hydrocarbon feed was treated in four reaction zones disposed in series in four reactors. The distribution of the catalyst in the reactors was as follows: 10%/20%/30%/40% by weight with respect to the total weight of catalyst.

The total quantity of catalyst was 75 tonnes.

Table 1 provides the composition of the hydrocarbon feed:

initial boiling point 100° C., final boiling point 170° C.:

TABLE 1

| Composition of feed (% by weight) | Paraffins | 50 |
| --- | --- | --- |
| | Olefins | 0 |
| | Naphtenes | 40 |
| | Aromatics | 10 |
| | RON | 45.7 |
| | Flow rate (t/h) | 150 |

The catalyst employed in the reactors comprised a chlorinated alumina type support, platinum and a tin promoter.

The feed heated to 514° C. was thus treated successively in the four reactors with intermediate heating of the effluent to 514° C. before introducing it into the next reaction zone.

The operating conditions in the four reaction zones are given in Table 2. These conditions were selected so as to produce a reformate recovered at the outlet from the fourth reactor for which the RON (Research Octane Number) index was equal to 102.

TABLE 2

| | Reactor 1 | Reactor 2 | Reactor 3 | Reactor 4 |
| --- | --- | --- | --- | --- |
| Reactor inlet temperature (° C.) | 514 | 514 | 514 | 514 |
| Pressure (MPa) | 0.69 | 0.65 | 0.60 | 0.55 |
| Space velocity ($h^{-1}$) | 20.0 | 10.0 | 6.7 | 5.0 |
| $H_2$/feed molar ratio (mol/mol) | 2.5 | — | — | — |

Example 2 corresponds to Example 1, except that the hydrocarbon feed was treated in five reactors disposed in series with the following catalyst distribution: 2%/10%/20%/30%/38% by weight with respect to the total catalyst weight. The small reactor in accordance with the present invention was placed at the head. This was the reactor 1.

The total quantity of catalyst was 75 tonnes in order to treat a hydrocarbon feed flow rate of 150 t/h.

As was the case with Example 1, the feed and the effluent from one reaction zone were heated to 514° C. before entering the next reaction zone.

The operating conditions in the reaction zones of the reactors are summarized in Table 3 below:

TABLE 3

| | Reactor 1 | Reactor 2 | Reactor 3 | Reactor 4 | Reactor 5 |
| --- | --- | --- | --- | --- | --- |
| Reactor inlet temperature (° C.) | 514 | 514 | 514 | 514 | 514 |
| Pressure (MPa) | 0.74 | 0.69 | 0.65 | 0.60 | 0.55 |
| Space velocity ($h^{-1}$) | 100.0 | 20.0 | 10.0 | 6.7 | 5.26 |
| $H_2$/feed molar ratio (mol/mol) | 2.5 | — | — | — | — |

The first reactor had the dimensions shown in FIGS. 1 and 2 with the geometrical characteristics described in Table 4.

TABLE 4

| HSV | ($h^{-1}$) | 100 |
| --- | --- | --- |
| Volume of catalyst | ($m^3$) | 1.74 |
| Number of modules | (—) | 6 |
| External diameter of modules | (m) | 0.5 |
| Internal diameter of modules | (m) | 0.3 |
| Height of annular reaction zones | (m) | 2.3 |
| Height/diameter ratio of annular reaction zones | (—) | 11.6 |
| Pressure drop of annular reaction zones | (mbars = $10^{-3}$ bar) | 18 |

By using the small head reactor of the invention, the drop in temperature in this first reaction zone was limited, and also in the other zones 2, 3, 4 and 5.

Given that the activity of the catalyst is a function of the mean temperature in the catalytic bed, by limiting the drop in temperature, in consequence, the yield of aromatic compounds was improved, as can be seen in Table 5.

TABLE 5

| | Example 1 (not in accordance with the invention) | Example 2 (in accordance with the invention) |
| --- | --- | --- |
| Feed flow rate/total quantity of catalyst ($h^{-1}$) | 2 | 2 |
| Reformate yield (C5+) (% by weight) | 91.7 | 90.7 |
| Aromatics yield (% by weight) | 72.4 | 74.1 |
| RON of reformate | 102.0 | 103.6 |

This increase in temperature in the catalytic beds had a substantial impact on the activity of the catalyst. For the same quantity of catalyst, as illustrated below, the gain in aromatics production resulted in an improvement in the RON of 1.6 points.

Example 3 can be used to illustrate what the invention provides as regards the severity of the feed. A feed becomes more severe as its paraffins content becomes higher. With an approach identical to that of the prior art, it is necessary to increase the quantity of catalyst or the reactor inlet temperature in order to maintain RON in the reformate. Example 3 was aimed at treating a feed as described in Table 6, which feed was much more severe than that of Example 1.

TABLE 6

| Composition of feed (% by weight) | Paraffins | 65 |
| --- | --- | --- |
| | Olefins | 0 |
| | Naphtenes | 25 |
| | Aromatics | 10 |
| | RON | 36.4 |
| | Flow rate (t/h) | 150 |

With the same operating conditions as those described in Tables 3 and 4, the RON of the reformate was kept at 102 despite an increase of 15% by weight in the quantity of paraffins in the feed.

TABLE 7

| | Example 1 (not in accordance with the invention) | Example 3 (in accordance with the invention) |
| --- | --- | --- |
| PNA of the feed (% by wt) | 50/40/10 | 65/25/10 |
| Feed flow rate/total quantity of catalyst ($h^{-1}$) | 2 | 2 |
| RON of reformate | 102.0 | 102.0 |

The invention claimed is:

1. A process for catalytic reforming of a gasoline type cut, comprising in a reactor with a radial flow of feed and a gravitational flow of catalyst, comprising an assembly of substantially identical modules (M) enclosed in a single shell (1) and distributed in a regular manner inside said shell in a circle, each module (M) having a height to diameter ratio in the range 7 to 11, and the shell having an upper portion and a lower portion (7) and having a catalyst inlet (10) introducing catalyst located in the upper portion, and a catalyst withdrawal outlet (11) evacuating said catalyst, located in the lower portion (7) of the shell (1), and a feed inlet via an upper central pipe (8) and an effluent evacuation outlet via a lower central pipe (12), each module being in the shape of a cylinder delimited by a substantially vertical outer wall (2) and a substantially vertical inner wall (5), the two walls (2) and (5) being assembled so as to define an annular zone (4) containing the catalyst, and the outer (2) and inner (5) walls of each module being permeable to gaseous feed and to gaseous effluents, and being constituted by a Johnson or equivalent type screen, said modules being positioned vertically in a generally symmetrical manner with respect to a center of the shell (1), and effluents from each module leaving via a central collector (3) of each module which communicates with the lower portion (7) of the shell (1), an inner volume (9) of the shell (1) and the lower portion (7) and the upper portion of the shell (1) being separated by a floor (13) which forms a seal between the inner volume (9) and the lower portion (7) and also serves to support the modules (M), each module (M) having a radial bed with a thickness being in the range 10 to 400 mm, and the number of modules being in the range 5 to 10, said reactor being placed at the head of a series of reactors constituting a reforming unit, in which:

feed to be reformed enters the shell (1) via the feed inlet in upper central pipe (8) located in the upper portion of the reactor and then occupies the inner volume (9) from which it penetrates into an interior of each module (M), passing through the outer wall (2) of said module;

the feed passes through a catalytic bed contained in an annular zone (4) of each module (M) and effluents resulting from catalytic reaction are collected in a central collector (3) of each module; then effluents from each module are collected in the lower portion (7) of the shell (1), and are evacuated from the reactor via the lower central pipe (12);

the catalyst is admitted into each module via admission pipe (10) and flows under gravity into the annular zone (4) of each module, then is evacuated from the module via catalyst withdrawal outlet pipe (11).

2. The process for catalytic reforming of a gasoline type cut according to claim 1, having a HSV (ratio of the flow rate of feed to the weight of catalyst) more than 50 $h^{-1}$.

3. The process for catalytic reforming of a gasoline type cut according to claim 1, in which the feed has a paraffins content up to 70% by weight.

4. The process for catalytic reforming of a gasoline type cut according to claim 1, in which the feed is entirely paraffinic.

5. The process according to claim 1, wherein in the reactor the thickness of the radial bed is 50 to 250 mm.

6. The process according to claim 2, wherein the HSV ratio is more than 100 $h^{-1}$.

* * * * *